2 Sheets—Sheet 2.
F. J. NOECHEL.
Machine for Grinding Spectacle-Glasses, &c.
No. 219,298. Patented Sept. 2, 1879.
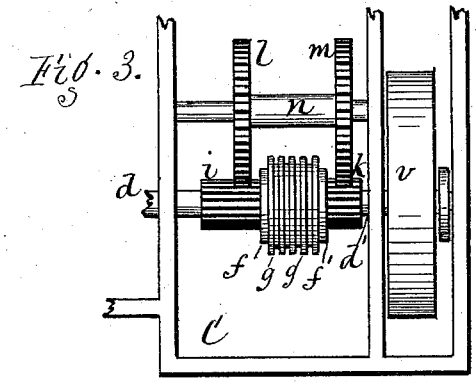
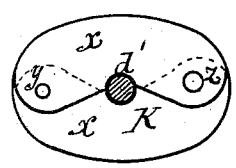
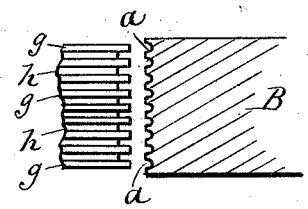
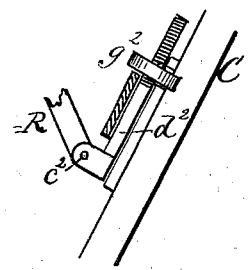
Attest.
Abner Burbank
R. E. White
Inventor.
Frank J. Noechel,
pr R. L. Osgood,
Atty.

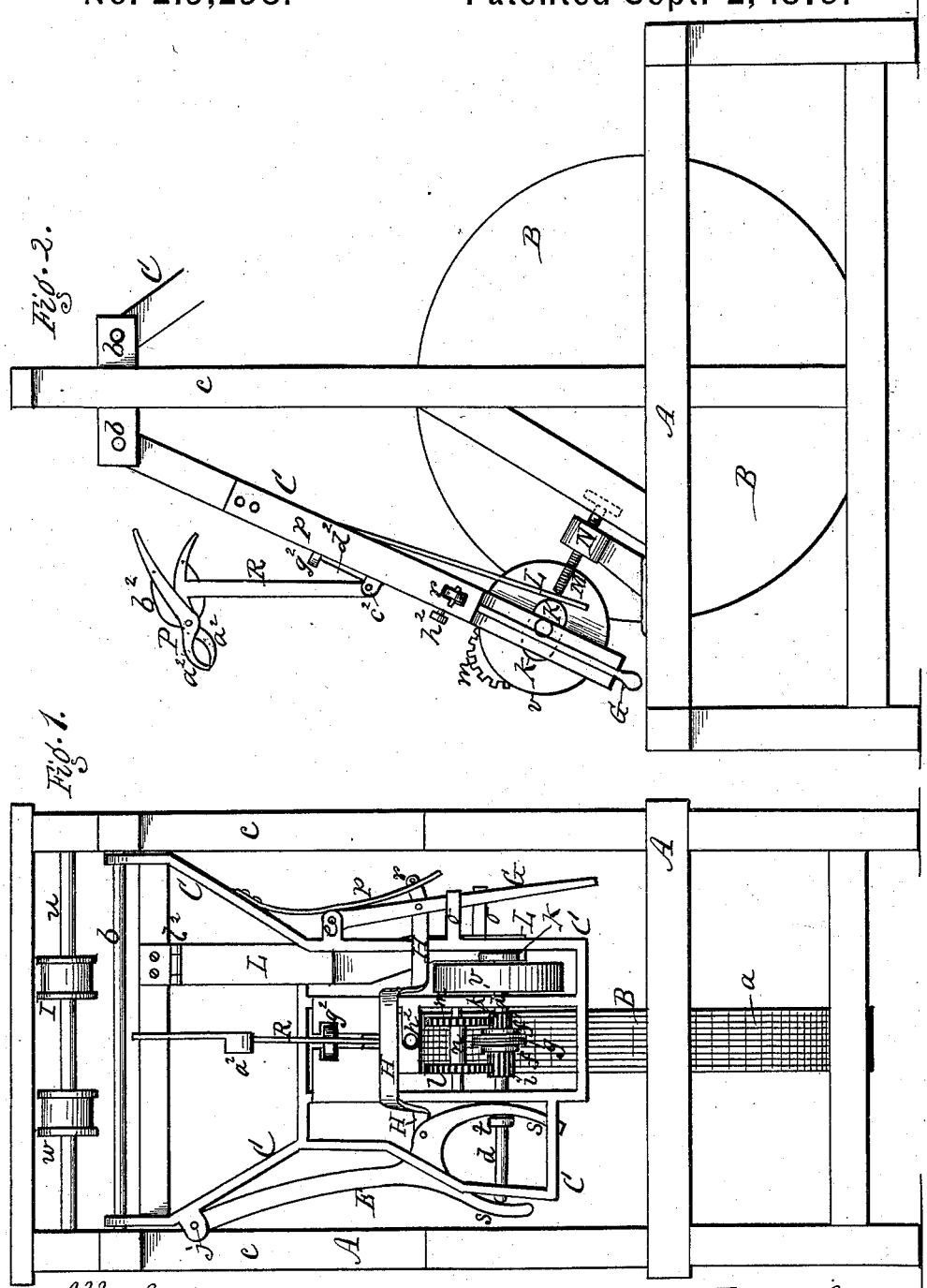

UNITED STATES PATENT OFFICE.

FRANK J. NOECHEL, OF ROCHESTER, NEW YORK.

IMPROVEMENT IN MACHINES FOR GRINDING SPECTACLE-GLASSES, &c.

Specification forming part of Letters Patent No. 219,298, dated September 2, 1879; application filed January 9, 1879.

*To all whom it may concern:*

Be it known that I, FRANK J. NOECHEL, of the city of Rochester, county of Monroe, and State of New York, have invented a certain new and useful Improvement in Machines for Grinding Spectacle and other Glasses; and I do hereby declare that the following is a full, clear, and exact description of the same, reference being had to the accompanying drawings, in which—

Figure 1 is a front elevation of my machine. Fig. 2 is a side elevation. Figs. 3, 4, 5, and 6 are detail views.

My improvement relates to a machine for grinding the edges of spectacle and other glasses to fit in their frames.

So far as I am aware the work has heretofore been done by hand, the glasses being held to the stone by the operator.

My invention consists of a machine for holding the edges of the glasses to a grooved stone, constructed, arranged, and operating as hereinafter more fully described.

A is the frame of the machine, which may be of any desired construction. I prefer, however, to make it of such form that several sets of the grinding machinery may be mounted in the same to grind a large number of the glasses at a time.

B is one or more grindstones mounted in the frame. The face of the stone is cut with a series of small circumferential grooves, $a\ a$, of V or half-round form in cross-section, and of a diameter equal to or less than the thickness of the glasses to be ground. I design to grind on both sides of this stone, and in order to adjust the grooves to the glasses when fixed in place the stone should have means of lateral adjustment.

C is one or more swinging frames, pivoted at $b\ b$ to the standards $c\ c$ of the main frame, and centered with respect to the grindstone B, so as to bring the edges of the glasses carried by the swinging frame accurately into the grooves $a\ a$ of the grindstone. I prefer to use two swinging frames with each grindstone, one on each side.

$d\ d^1$ are short shafts in the lower part of the swinging frame, and $f\ f'$ are clamps or heads on the inner ends of these shafts, which hold the glasses $g\ g$ while they are being ground.

The shafts have an end movement, and are arranged to open and close, to allow the glasses to be inserted in and removed from the clamps.

$h\ h$ are packings between the glasses, of such thickness as will bring the edges of the glasses in line with the grooves of the stones. The packings are soft, to prevent breakage of the glasses.

$i$ and $k$ are small pinions on the shafts $d\ d^1$. $l$ and $m$ are spur-wheels, which engage with said pinions, being both situated on a short shaft, $n$.

The pinion $i$ is long enough to allow the proper end motion of its shaft $d$ to allow the clamps to open, and yet keep in gear with its spur-wheel.

By the means above described the clamps can open and close, and they also retain the same relative position in turning the glasses as if they were both on one shaft. This is necessary, since the glasses are of oval form, and must be arranged in coincidence, be centered, and be turned exactly alike to bring all their edges into the grooves of the stone in turning.

E is a rock-arm, pivoted at $j$ on one side of the swinging frame. G is a rock-lever, pivoted at $e$ on the opposite side. The rock-arm and rock-lever are connected across the frame by a connecting-bar, H, pivoted at its opposite ends to both of said parts. When the lever is swung inward the arm is swung outward, and vice versa. The lever rests between guides $o\ o$, which keep it in place. $p$ is a spring, attached to the side of the frame and connected with the connecting-bar H or the lever G, as shown at $r$, in such a manner as to hold said lever outward in the position shown in Fig. 1; but when pressure is applied to the lever inward the spring yields and the rock-arm is correspondingly moved outward. At the bottom the rock-arm E is provided with two forks, $s\ s$. The end of shaft $d$ rests against the outer fork, and a collar or enlargement, $t$, fast on the shaft, rests against the inner fork, so that as the rock-arm is thrown out or in the shaft $d$ will be correspondingly thrown, thereby opening or closing the clamps.

The rock-arm, by bearing constantly against the shaft $d$ by spring-pressure, keeps the glasses tightly clamped at all times.

I is a pulley on the upper shaft, $u$, of the main frame, and $v$ is a pulley on the shaft $d^1$, which turns the clamp. These pulleys are connected by a band. When the swinging frame is turned down in operating position the band is straightened and gives motion to the mechanism for turning the glasses; but when the frame is raised the band slackens and the mechanism stops. The shaft $u$ also has another pulley, $w$, by which the initial power is applied.

K is a form or pattern attached fast to shaft $d^1$, being of the same shape and standing in the same relative position as the clamps $f\,f'$. This form is preferably made in two parts and arranged to be placed over and removed from its shaft, being secured thereto in any desired way. By this means different sized and shaped forms can be used, according to the size and shape of the glasses to be ground.

L is a flat plate hinged at $l^2$ to the top of the swinging frame, thence extending down under and in contact with the inner side of the form K and receiving the rolling contact of the form. M is an adjusting-screw passing through a bearing, N, and resting against the plate L. The form, as it revolves against the plate, will be thrown out and in by reason of its oval shape, thereby properly guiding the edges of the glasses in the grooves of the stones.

By turning the adjusting-screw M up or back the same is adapted to the use of different-sized forms for grinding different-sized glasses.

P is a gage for setting the glasses in coincidence and centering them to the clamp. It is an instrument in the shape of nippers or tongs pivoted together and provided with two curved jaws, $a^2\,a^2$, of the same shape as the glasses. They are closed together by a spring, $b^2$. These jaws are attached to a shank, R, which is pivoted at $c^2$ to a slide, $d^2$, having a screw-thread at its top, on which rests a nut, $g^2$, resting on a shoulder or being otherwise relatively stationary, so that when it is turned it will raise or lower the shank R, and thereby adjust the position of the gage. The jaws are concentric with the clamps, so that when the glasses are placed in them and the jaws are then turned down the glasses will be received within the clamps in proper position to be held to the stone. The jaws serve a twofold purpose—first, they arrange or set the glasses all in the same position ready to be received in the clamp; and, second, they insert the glasses in the clamp ready to be operated on.

$h^2$ is an adjustable stop, consisting of a screw resting in a bearing of the frame, and capable of being moved out and in. It forms a stop to the gage, which strikes down upon it. It is necessary to fit different-sized glasses from the gage to the clamp and properly center them.

What I claim herein as new is—

1. In a machine for grinding glasses, the combination of a circumferentially-grooved grindstone, B, for grinding the edges of the glasses, shafts $d\,d^1$, and self-closing clamps $f\,f'$, for holding the glasses to fit the stone, and a form for controlling the position of the glasses while being ground.

2. In a machine for grinding glasses, the combination, with the shafts $d\,d^1$, provided with clamps $f\,f'$, of the pinions $i\,k$, spur-gears $l\,m$, and the shaft $n$, forming a connection from one shaft to the other, so arranged as to preserve coincidence of the clamps and allow the clamps to open and close, as herein shown and described.

3. The combination, with the two shafts $d\,d^1$, provided with the clamps $f\,f'$, of the rock-arm E, connecting-bar H, rock-lever G, and spring $p$, as shown and described, and for the purpose specified.

4. In a machine for grinding glasses, the combination, with the shaft $d^1$, which revolves the glasses, of the screw M, adjustable to different positions to adapt the same to forms of different sizes for grinding different-sized glasses, as herein described.

5. In combination with the form or pattern K, the hinged plate L and adjusting-screw M, as and for the purpose specified.

6. The combination, with the clamps $f\,f'$, of a gage, P, capable of grasping and holding the glasses and inserting the same centrally in the clamps, as herein specified.

7. The combination, with the gage P, of the adjustable stop $h^2$, as and for the purpose specified.

In witness whereof I have hereunto signed my name in the presence of two subscribing witnesses.

FRANK J. NOECHEL.

Witnesses:
R. F. OSGOOD,
GEORGE A. BENTON.